Sept. 30, 1947.            L. RAYMOND            2,428,094
ARCH-SHAPED MOLD FOR THE MAKING OF CUSTOM
MADE PREARRANGED ACRYLIC TEETH
Filed Sept. 15, 1945
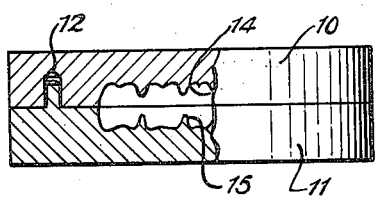
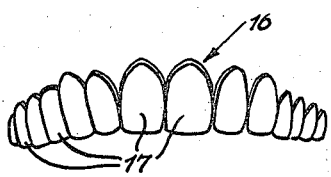
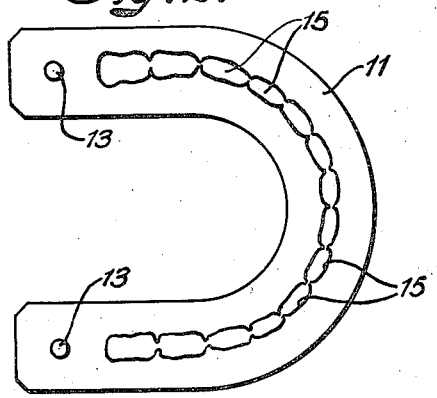
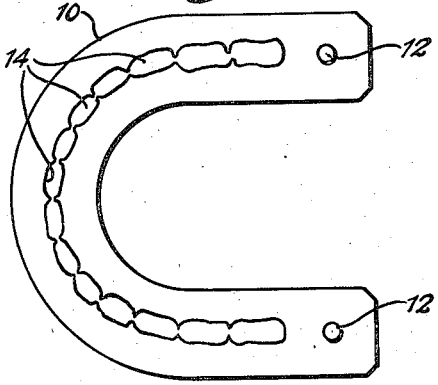
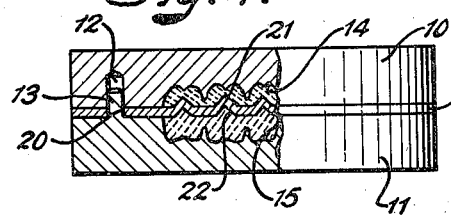
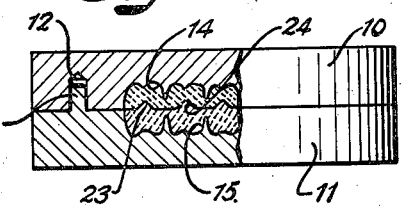
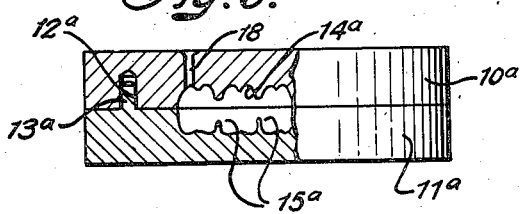
Inventor
*Louis Raymond.*
By *Clarence A. O'Brien and Harvey B. Jacobson*
Attorneys Patented Sept. 30, 1947

2,428,094

UNITED STATES PATENT OFFICE 2,428,094

ARCH-SHAPED MOLD FOR THE MAKING OF CUSTOM-MADE PREARRANGED ACRYLIC TEETH

Louis Raymond, New York, N. Y.

Application September 15, 1945, Serial No. 616,551

1 Claim. (Cl. 18—34.1)

This invention relates to a mold for making a full set of artificial teeth.

Among its features, my invention embodies a mold having a generally arch-shaped form which is separable horizontally and is provided in each mold half with mating tooth-forming cavities into which a suitable plastic, such as an acrylic material, may be introduced and cured to form the complete set of teeth.

Other features include means for separating the upper and lower halves of the teeth being formed so that the plastic or acrylic materials may be tinted a different color in one half from that of the other half of a tooth, whereby, when the teeth halves are joined together, a natural appearance will be the result.

A still further feature of the invention is a division plate adapted to be used between the upper and lower mold halves having formed in one side a depression adapted to align with the tooth half cavity in one side of the mold and having, on the opposite side, a projection which is adapted to align with the tooth half cavities on the opposite mold half so that when the teeth have been partially formed, the plate may be removed and the two teeth halves joined with the projection of one mating in the recess of the other, whereby the parts will be accurately aligned for final curing.

In the drawings:

Figure 1 is a side view, partly in section, of a tooth mold embodying the features of my invention, Figure 2 is a top plan view of the lower half of my improved mold, Figure 3 is a bottom plan view of the upper half of my improved mold, Figure 4 is a view similar to Figure 1 showing my separator plate in use in the mold, Figure 5 is a view similar to Figure 4 showing the parts after the separator plate has been removed, Figure 6 is a view partly in section of a mold provided with an injection opening, and Figure 7 is a front view in elevation of a set of teeth produced in accordance with my invention.

Referring to the drawings in detail, my improved dental mold comprises a pair of mating mold halves 10 and 11, each of which comprises a substantially U-shaped body. Formed in the upper half 10 near the ends of the legs of the U-shaped body and projecting inwardly from its under face are recesses 12 which are adapted to receive mating projections 13 on the lower mold half 11. The mold half 10 is formed in its under face with a plurality of cavities 14 which are respectively shaped to produce the upper halves of a set of teeth and formed in the upper face of the bottom mold half 11 are mating cavities 15 in which the lower halves of a set of artificial teeth are to be formed. The cavities 14 and 15 are adapted to align with one another when the pins 13 extend into the recesses or sockets 12 so that when the cavities 14 and 15 are filled with tooth-forming materials they will be in such a position that a full set of artificial teeth may be produced. A complete set of artificial teeth designated generally 16 and comprising the individual units 17 made in accordance with this invention is illustrated in Figure 7 and these may be formed of any suitable substance such as the plastic and acrylic materials now in common use throughout the various industries.

In use, the plastic material from which the teeth 17 are to be formed is introduced into the mold cavities 14 and 15 and the two mold halves 10 and 11 are assembled, as illustrated in Figure 1, in which position they are held by a suitable clamp (not shown) and then subjected to thermal treatment, such as immersion in a bath of hot water to effectively set and cure the plastic materials. Having subjected the molds and their contents to the proper treatment for an adequate period of time, the molds may be separated and the complete set of teeth 16 removed therefrom ready for use in making restorations. The procedure just set forth is primarily adapted for use in connection with the production of artificial teeth 17 from a plastic material in finely divided or powdered form.

In order that the mold may be employed for the production of artificial teeth 17 from a liquid plastic substance, I modify the upper mold half 10a in Figure 6 by providing an injection opening 18 so that the liquid plastic may be injected into the mold cavities 14a and 15a formed in the upper and lower mold halves 10a and 11a, respectively. Like the mold halves 10 and 11, the mold halves 10a and 11a are respectively provided with sockets 12a and pins 13a which, as previously described, assure proper alignment of the mold cavities 14a and 15a when the device is assembled. The invention thus far described discloses the manner of making artificial teeth which are of uniform color throughout both their upper and lower halves.

In instances where it is desirable for the production of teeth having a more natural appearance, I find it convenient to employ a separator plate 19 which is of substantially U-shaped construction corresponding to the shape of the mold halves 10 and 11 and is provided with openings 20 which are adapted to align with the sockets 12 so that when the mold halves 10 and 11 are assembled, the pins 13 will project through the openings and thus hold the plate 19 in proper position therebetween. This plate is provided, on one side, with spaced projections 21 which are adapted to align axially with the teeth cavities in the mold halves, and the opposite side of the plate is provided with spaced recesses 22 which axially align with the projections 21. It is important that the recesses 22 form projections 23 on the lower halves of the teeth which are of the same size and shape as the cavities 24 formed in the opposite halves of the teeth so that when the plate 19 has been removed and the mold halves 10 and 11 assembled as illustrated in Figure 5, the projections 23 will accurately fit the sockets 24 to assure proper orientation of the parts.

In use, when it is desired to make a set of teeth of a composite nature, for instance, having the upper halves of a slightly different color or shade from the lower halves, the plate 19 is interposed between the upper and lower mold halves 10 and 11 after the cavities therein have been filled with the plastic material and the parts clamped together and subjected to a partial curing. The curing is not carried to a point of completion with the plate in position, but after the plastic material has become partially set, the mold halves are separated and the plate 19 removed. After the removal of the separator plate 19, the material in both halves 10 and 11, while still in a plastic state, has assumed the shape given to it by the separator plate 19. Now the two halves are joined with a clamp for the curing process. The material in both halves being of the same physical and chemical structure, forms a perfect union and is cured all in one process.

The separator plate 19 is used only for the compression of the material in the two halves of the arch-shaped mold 10 and 11. Then it is removed and the two halves are joined together with a clamp for the curing process.

The separator plate 19 is used only when it is desired to use two different shades or colors of acrylic material for teeth made in the arch-shaped mold. The object of the two colors is to imitate the exact coloring of natural teeth, which invariably are of two different tints—the upper part of a tooth being always darker than the lower part.

Inasmuch as the acrylic material is somewhat translucent, the recesses 22 with the projections 21 in the separator plate 19, permit a gradual blending of the two colors used, thus giving the teeth produced in the arch-shaped mold a life like appearance.

While in the foregoing there has been shown and described the preferred embodiment of this invention, it is to be understood that minor changes in the details of construction and combination and arrangement of parts may be resorted to without departing from the spirit and scope of the invention as claimed.

What is claimed is:

A mold for the production of an arch-shaped set of contiguous artificial teeth in natural relation to each other from a thermo-plastic comprising an arch-shaped mold bottom having contiguous mold cavities therein conforming in size and shape to the exterior contour of the lower halves of a full set of teeth, an arch-shaped mold top having contiguous mold cavities therein conforming in size and shape to the exterior contour of the upper halves of a full set of teeth, and a removable arch-shaped separator plate adapted to be introduced between the mold halves during the preliminary stages of the molding of the teeth, said arch-shaped separator plate having a series of depressions in one side adapted to align with the mold cavities in one half of the mold, a series of projections on the opposite side of the arch-shaped separator plate adapted to align with the mold cavities in the opposite half of the mold, and means to guide the mold halves and separator plate accurately to align the mold cavities of one half of the mold with the depressions in the separator plate, and the mold cavities in the other half of the mold with the projections formed by the depressions on the separator plate whereby the projections formed by the depressions in the separator plate on the material being molded in one half of the mold will enter the mating recesses formed by the projections on the separator plate in the material being molded in the other half of the mold when the separator plate has been removed from the mold.

LOUIS RAYMOND.

REFERENCES CITED

The following references are of record in the file of this patent:

UNITED STATES PATENTS

| Number | Name | Date |
| --- | --- | --- |
| 1,794,435 | Barth | Mar. 3, 1931 |
| 16,433 | Blandy | Jan. 20, 1857 |
| 1,547,643 | Clapp | July 28, 1925 |
| 2,101,431 | Groff | Dec. 7, 1937 |
| 2,230,164 | Myerson | Jan. 28, 1941 |
| 2,345,305 | Thornton | Mar. 28, 1944 |
| 2,370,623 | Gibson, Jr. | Mar. 6, 1945 |
| 752,378 | Dailey | Feb. 16, 1904 |
| 992,199 | Hutchinson | May 16, 1911 |
| 2,219,576 | Moreland | Oct. 29, 1940 |
| 2,279,067 | Shapiro | Apr. 7, 1942 |
| 990,548 | Gysi | Apr. 25, 1911 |

FOREIGN PATENTS

| Number | Country | Date |
| --- | --- | --- |
| 514,830 | Great Britain | Nov. 20, 1939 |